(12) United States Patent  (10) Patent No.: US 7,683,270 B2
Fernandez et al.  (45) Date of Patent: Mar. 23, 2010

(54) TELECOMMUNICATIONS CABINET

(75) Inventors: Pedro Fernandez, Dallas, TX (US); Tri H. Nguyen, Richardson, TX (US)

(73) Assignee: Telect Inc., Liberty Lake, WA (US)

( * ) Notice: Subject to any disclaimer, the term of this patent is extended or adjusted under 35 U.S.C. 154(b) by 736 days.

(21) Appl. No.: 11/275,803

(22) Filed: Jan. 30, 2006

(65) Prior Publication Data

US 2006/0273081 A1  Dec. 7, 2006

Related U.S. Application Data (60) Provisional application No. 60/687,628, filed on Jun. 3, 2005.

(51) Int. Cl.
H05K 7/20 (2006.01)
H01L 23/02 (2006.01)
H01R 13/502 (2006.01)

(52) U.S. Cl. .................. 174/547; 174/560; 174/564; 361/688; 361/809

(58) Field of Classification Search ............. 174/50, 174/520, 535, 559, 560, 564, 547; 361/688, 361/809
See application file for complete search history.

(56) References Cited

U.S. PATENT DOCUMENTS

| | | | |
|---|---|---|---|
| 4,664,471 A | 5/1987 | Mignien et al. |
| 4,773,729 A | 9/1988 | Mignien |
| 4,824,196 A | 4/1989 | Bylander |
| 5,100,221 A | 3/1992 | Carney et al. |
| 5,323,480 A | 6/1994 | Mullaney et al. |
| 5,363,466 A | 11/1994 | Milanowski et al. |
| 5,708,751 A | 1/1998 | Mattei |
| 5,956,449 A | 9/1999 | Otani et al. |
| 5,982,972 A | 11/1999 | Tucker et al. |
| 6,009,224 A | 12/1999 | Allen |
| 6,250,816 B1 | 6/2001 | Johnston et al. |
| 6,263,141 B1 | 7/2001 | Smith |
| 6,322,378 B1 | 11/2001 | Auclair |
| 8,360,050 | 3/2002 | Moua, et al. |
| 6,385,381 B1 | 5/2002 | Janus et al. |
| 6,418,266 B1 | 7/2002 | Vitantonio |
| 6,434,316 B1 | 8/2002 | Grois et al. |
| 6,438,310 B1 | 8/2002 | Lance et al. |
| 6,575,640 B2 | 6/2003 | Connelly et al. |

(Continued)

OTHER PUBLICATIONS

ADC Telecommunications Inc. enclosure displayed at the International Engineering Consortium (IEC) SUPERCOMM Conference, held in Chicago, IL, Jun. 6-9, 2005.

(Continued)

Primary Examiner—Hung V Ngo
(74) Attorney, Agent, or Firm—Lee & Hayes, PLLC (57) ABSTRACT

Embodiments of a storage cabinet and methods for making and using such cabinet are disclosed. In one embodiment of an apparatus. a tubular sealed chamber for storing telecommunications equipment is coupled to a sealed chamber to support the sealed chamber. The tubular sealed chamber comprises at least one mount configured to attach and remove the telecommunications equipment, a tube and at least one door to enclose one end of the tube. The support structure partially surrounds the sealed chamber and an area between the sealed chamber and the support structure defines an inter-tube space that functions as a thermal barrier.

10 Claims, 7 Drawing Sheets

U.S. PATENT DOCUMENTS

| | | |
|---|---|---|
| 6,591,051 B2 | 7/2003 | Solheid et al. |
| 6,631,237 B2 | 10/2003 | Knudsen et al. |
| 6,633,717 B1 | 10/2003 | Knight et al. |
| 6,870,734 B2 | 3/2005 | Mertesdorf et al. |
| 6,925,241 B2 | 8/2005 | Bohle et al. |
| 6,980,725 B1 | 12/2005 | Swieconek |
| 7,054,536 B2 | 5/2006 | Sun |
| 7,067,734 B2 * | 6/2006 | Abe et al. .................. 174/359 |
| 7,102,884 B2 | 9/2006 | Mertesdorf et al. |
| 7,425,685 B1 * | 9/2008 | Gundogan et al. .......... 174/520 |
| 2003/0206704 A1 | 11/2003 | Lee et al. |
| 2004/0057691 A1 | 3/2004 | Doss et al. |
| 2004/0175090 A1 | 9/2004 | Vastmans et al. |
| 2005/0111809 A1 | 5/2005 | Giraud et al. |
| 2005/0111810 A1 | 5/2005 | Giraud et al. |
| 2005/0129379 A1 | 6/2005 | Reagan et al. |
| 2005/0281526 A1 | 12/2005 | Vongseng et al. |
| 2007/0047896 A1 | 3/2007 | Kowalczyk et al. |
| 2007/0104447 A1 | 5/2007 | Allen |

OTHER PUBLICATIONS

"Cable fixing Device D.E.P. Linx Notice d'Installation/Installing practice", Nexans Interface, 2 pages.

"Patching, Splicing and Coiling Module", Nexans Interface, 1U-12 Splices for 12 adapters, 1 page.

"Splicing and Coiling Module: 1U-24 Splices, Left or Right Opening" Nexans Interface, 1 page.

"Storage Optical Module, Left or Right Opening", Nexans Interface, 1 page.

Three photographs of a bracket made by Pirelli Cable Corporation, at least as early as Sep. 30, 2004, 1 page.

"Vario-Spleissbox 3: Vario-Splice Box 3:", 3 pages.

\* cited by examiner

TELECOMMUNICATIONS CABINET

RELATED APPLICATIONS

The present application claims priority under 35 U.S.C. § 119 to U.S. Provisional Application Ser. No. 60/687,628 filed Jun. 3, 2005, to Ellison et al., and titled "Cable Cabinets and Chassis", the disclosure of which is hereby incorporated by reference in its entirety.

TECHNICAL FIELD

The present invention generally relates to the field of storage cabinets and more particularly relates to outdoor storage cabinets for storing cable and other equipment used to form a telecommunications infrastructure.

BACKGROUND

Many different industries utilize storage cabinets for storing varying types of equipment. For example, businesses in the telecommunications industry often use storage cabinets for storing cable, electronic equipment, and other telecommunication equipment. Additionally, these cabinets may be used for storing equipment both indoors and outdoors. For both applications, and especially for an outdoor storage cabinet, the cabinet is formed such that equipment stored inside the cabinet is protected from the outside elements. This protection is often mandated by industry regulations.

Traditional storage cabinets, however, are complicated to produce and often do not adequately provide chamber sealing, structural strength, and cooling efficiency.

SUMMARY

Apparatuses and methods for storing equipment are disclosed. One embodiment of an apparatus includes a tubular sealed chamber configured to store telecommunications equipment and a tubular support structure coupled to the sealed chamber and configured to support the sealed chamber. The tubular sealed chamber may comprise at least one mount configured to removably attach telecommunications equipment. The support structure may be configured to at least partially surround the sealed chamber thereby defining a thermal barrier.

Another embodiment of an apparatus for storing electronic equipment includes an enclosure comprising a horizontal tube with a cross-section defining a first plane and a cover comprising a vertical tube with a cross-section defining a second plane. The vertical tube may be configured to at least partially bound the horizontal tube, and the first plane may be substantially orthogonal to the second plane.

An embodiment of a method for storing equipment may include fabricating an inner tube with a cross-section defining a first plane, sealing the inner tube so as to define a sealed chamber, fabricating an outer tube with a cross-section defining a second plane, and coupling the inner tube and the outer tube for strengthening the sealed chamber. The first plane may be substantially perpendicular to the second plane.

DETAILED DESCRIPTION

It should be noted that the following devices are examples and may be further modified, combined and separated without departing from the spirit and scope thereof.

Figure 1:
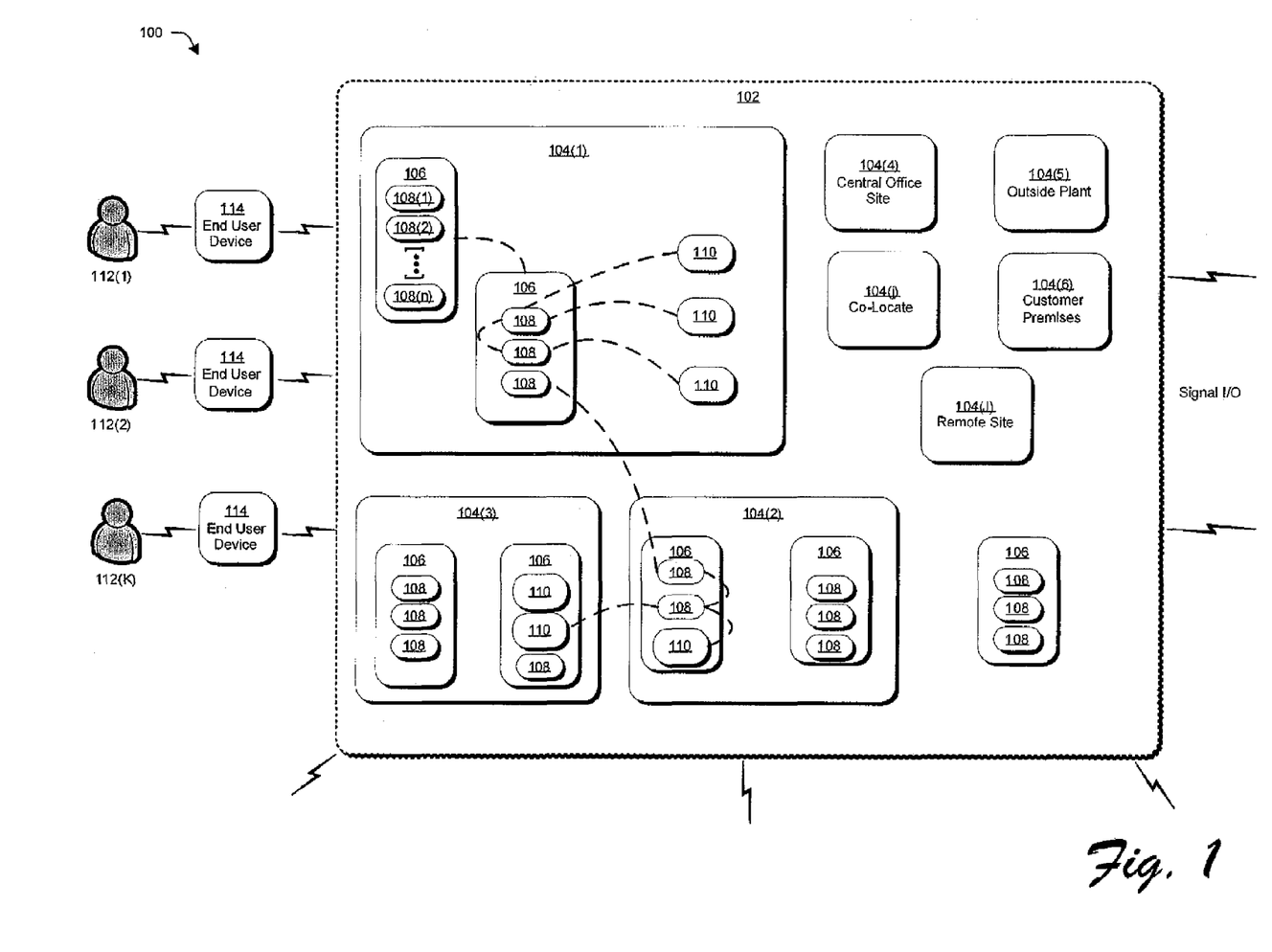
FIG. 1 is an illustration of a telecommunications environment in an exemplary implementation in which a cabinet of the present disclosure may operate.

FIG. 1 illustrates an exemplary implementation of an environment 100 operable to provide a telecommunications network in which the apparatuses and procedures of the present disclosure may be employed. It should be noted that the exemplary environment is not limiting and is one of many environments in which the apparatuses and processes of the present disclosure may be used. The environment 100 includes at least a portion of a telecommunication network infrastructure 102 (hereinafter "infrastructure"). Infrastructure 102 provides telecommunications processes, structures, equipment and devices between end-user devices such as modems, phones, and so on used by end-users outside of the infrastructure 102 to communicate via a telecommunications network. Within infrastructure 102 a variety of equipment, apparatus and devices are utilized in routing, processing, and distributing signals. Telecommunications signals and data may among other actions be processed, switched, routed, tested, patched, managed, or distributed by various equipment in the infrastructure 102.

A variety of sites 104(1)-104(j) within infrastructure 102 may maintain various equipment used in the infrastructure 102, where "j" may be any integer from one to "J". As depicted in FIG. 1, infrastructure 102 may have numerous sites 104 which may be different physical locations within infrastructure 102 such as a central office, an outside plant site, a co-locate site, a remote site, or customer premises. Sites 104 may be locations within infrastructure 102 which hold a variety of structures and equipment to facilitate processing and distributing of telecommunications signals. The equipment may be centralized in one site (e.g., site 104(1)) or dispersed throughout different sites 104 in infrastructure 102. In other words, interconnections may be made between various sites 104 in infrastructure 102, for example the connection denoted in FIG. 1 by a dashed line between site 104(1) and 104(2). Naturally, numerous interconnections between a plurality of sites 104 typically may be made.

Each site 104 may have one or more cabinets 106 having a plurality of components 108. A cabinet refers to a structure to maintain or hold a plurality of components 108 in infrastructure 102 and may be configured in a variety of ways. For example, the cabinet 106 may be configured as a housing for a terminal block, a panel, a protector block, a chassis, a digital cross-connect, a switch, a hub, a rack, a frame, a bay, a module, an enclosure, an aisle, or other structure for receiving and holding a plurality of components 108. Cabinets 106 may be inside a building or cabinets may themselves be configured to be placed outside, e.g. an outside plant cabinet. Cabinets 106 may typically be configured to protect components 108 from environmental influences. The environment 100 of FIG. 1, for instance, depicts site 104(1) as having two cabinets 106, each having a plurality of components 108. Other cabinets 106 may be included throughout infrastructure 102 at sites 104, for example cabinets 106 depicted within site 104(2).

Components 108 are pieces of telecommunications equipment in infrastructure 102 that may be kept or maintained in a cabinet 106 within the infrastructure 102. Components for example may be cross-connect panels, modules, terminal blocks, protector blocks, chassis, backplanes, switches, digital radios repeaters and so forth. If the cabinets are used in a different environment, they may be configured to keep or maintain a variety of other components or equipment. In the exemplary environment, components 108 may generally be those devices utilized for processing and distributing signals in infrastructure 102 and which may be maintained in a cabinet 106. Components 108 may also be used to manage cabling in infrastructure 102. Components 108 may terminate, interconnect or cross-connect a plurality of network elements 110 within infrastructure 102. Components 108 may be utilized to distribute telecommunications signals sent to and from infrastructure 102 by one or more end-users 112 using an end-user device 114. The interconnections between telecommunications equipment (e.g., cabinets 106, components 108 and network elements 110) provide signal pathways for telecommunications signals. Interconnection may be via one or more components 108 such as by connectors disposed on a component, such as a protector block, or may be internal to the components 108 such as via cabling within a component 108. Representative interconnections are shown by dashed lines in FIG. 1 and numerous interconnections within and between telecommunication equipment are typical.

Network elements 110 may be implemented in a variety of ways. For example, network elements 110 may be configured as switches, digital cross connect system (DCS), telecommunication panels, terminal blocks, protector blocks, digital radios, fiber optic equipment, network office terminating equipment, and any other telecommunication equipment or devices employed in a telecommunications infrastructure 102. It is noted that one or more of the components 108 within a cabinet 106 may also be a network element 110. In other words, network elements 110 may be found within a cabinet 106 as component 108 of the cabinet. Thus, in a particular cabinet 106 interconnections may be between network elements 110 externally (e.g., not in the same cabinet) or internally (e.g., within the same cabinet). Naturally, internal and external interconnections may be mixed such that a single cabinet 106 will have both internal and external interconnections. Further, such connections for a particular cabinet 106 might be made wholly within a particular site 104. Interconnections may also be made between a plurality of sites 104.

The environment 100 depicts a plurality of end users 112(1)-112(k), where "k" may be any integer from one to "K". End users 112(1)-112(k) may be communicatively coupled, one to another, via a telecommunication network including infrastructure 102. End users 112 may be implemented in a wide variety of ways, such as consumers, business users, internal users in a private network, and other types of users that use telecommunications signals or transmit and receive telecommunications signals. Additionally, for purposes of the following discussion clients 112(1)-112(k) may also refer to client devices and software which are operable to transmit and receive telecommunications signals. Thus, clients 112(1)-112(k) may be implemented as users, software and devices.

The interconnection of pieces of equipment (e.g. cabinets 106, components 108 and network elements 110, and so forth) provides signal pathways between equipment for signals input to and output from infrastructure 102. For example, end-users 112(1)-112(k) may send signals into the infrastructure 102 and receive signals output from the infrastructure using a variety of end user devices 114. For example, end user 112(2) may communicate with end user 112(k) via end-user device 114 (e.g., a telephone). Thus, signals sent to and from infrastructure by end-users 112 via an end user device 114, may be routed directed, processed, and distributed in a variety of ways via the equipment and interconnections within infrastructure 102.

In an implementation, one or more cabinets 106 may be configured as distribution frame such as a main distribution frame (MDF) or intermediate distribution frame (IDF). A distribution frame has a plurality of components 108. Typically, components 108 in a distribution frame distribute telecommunications signals between network elements 110 within infrastructure 102 and between end-users 112. A distribution frame may provide a centralized interconnection point, for example in a telephone system or digital subscriber line system which provides service to end-users 112, and having equipment for terminating and interconnecting end-user lines (e.g. subscribers). The distribution frame is used to connect end-users lines, one to another, or to connect end user lines through network elements 110 in infrastructure 102. The distribution frame in a site 104 may also holds protective devices and act as a test point between end-users 112 and equipment in infrastructure 102.

In another implementation, a cabinet 106 may be configured for application at an outside plant site such as site 104(5) depicted in FIG. 1. In other words, the cabinet 106 may be an outside plant cabinet. An outside plant cabinet, as the name suggests, is located outside and is configured to protect a plurality of components 108, from environmental influences (e.g., heat, cold, wind, rain and so forth). Naturally, protecting components 108 from electrical surges is a particular concern in an outside plant application where damage due to lightning strikes is more likely. Therefore, outside plant applications may be particularly suited for the surge protection devices, although it may be appreciated that the surge protection may also be applied in other applications such as in an indoor cabinet 106, at a central office site 104(4) and so forth.

In an implementation, a cabinet 106 has a plurality of components 108 to connect numerous lines. A cabinet 106 may have a plurality of components 108 configured as protector blocks, as depicted in FIG. 1 by protection blocks 108(1), 108(2), . . . , 108(n), where "n" may be any integer from one to "N". Protector blocks 108(1)-108(n) provide modular connection points within a cabinet 106 between various network elements 110 such as switches, cross-connects, terminal blocks, other protector blocks and so forth. End-users 112 may be connected via twisted pair cabling to protector blocks 108(1)-108(n) in a cabinet 106 located within infrastructure 102. Further, end-users 112 may be connected via a plurality of network elements 110 which are connected via the various equipment in infrastructure 102, including the interconnections of a plurality of protector blocks such as protector blocks 108(1)-108(n). For example, an end-user telephone call made between end user 112(1) and end user 112(2) may be routed using one or more protector blocks 108(1)-108(n) and/or various network elements 110 within infrastructure 102.

Figure 2:
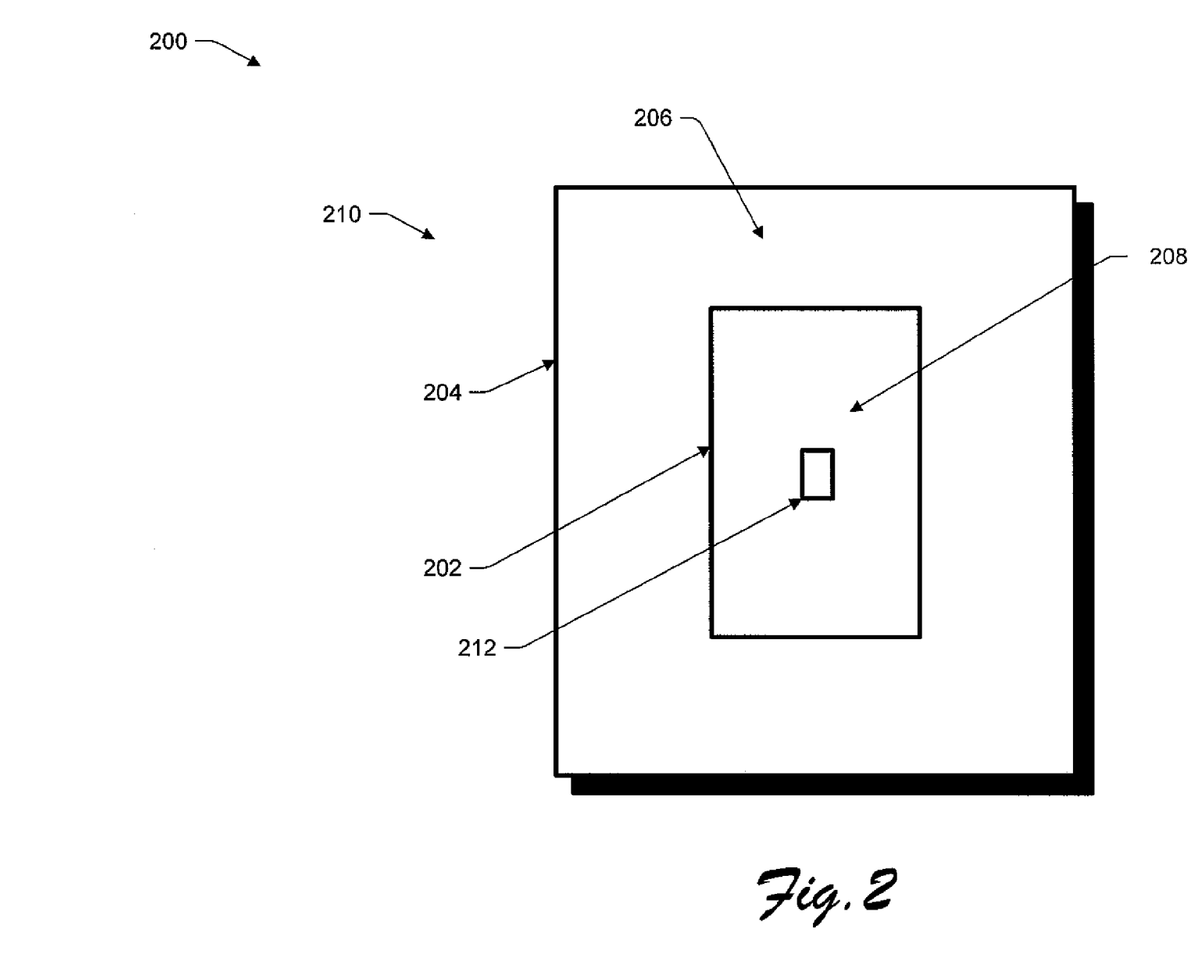
FIG. 2 is an exemplary cabinet of the present disclosure for storing equipment such as telecommunication components.

FIG. 2 is an illustration of a cabinet 200 that is an exemplary cabinet 106 described in greater detail. While the cabinet 200 may be discussed as being used in an outdoor environment, the cabinet may also be used indoors. As shown in FIG. 2, cabinet 200 may include a chamber 202, a support structure 204, and a thermal barrier 206.

Chamber 202 may be configured to store varying types of equipment. As described above in the exemplary environment, chamber 202 may be used to store telecommunications equipment, such as cross-connect panels, modules, terminal blocks, protector blocks, chassis, backplanes, switches, digital radios, repeaters, cable and so forth, in an area inside the chamber 208. The equipment stored in the chamber may generally be those devices utilized for processing and distributing signals in infrastructure 102. Chamber 202 may also be used to manage cabling in infrastructure 102. The stored equipment may terminate, interconnect or cross-connect a plurality of network elements 110 within infrastructure 102. The equipment stored in the chamber may be utilized to distribute telecommunications signals sent via infrastructure 102 by one or more end-users 112 using an end-user device 114.

Support structure 204 is configured to support chamber 202. As shown in FIG. 2, support structure 204 may partially or completely bound chamber 202. The area created when support structure 204 bounds chamber 202 may generally form a thermal barrier 206, which may represent a buffer between the area inside the chamber 208 and an area outside the support structure 210. When the cabinet 200 is used in outdoor applications, the area outside the support structure 210 will generally be exposed to the outside elements. Therefore, when cabinet 200 is located outdoors, support structure 204 may function to isolate chamber 202 and the area inside the chamber 208 from the outside elements. Thermal barrier 206 may function to provide a buffer between the temperatures and other conditions (e.g. humidity, wind, rain, snow, etc.) of areas 208 and 210. Thermal barrier 206 may also provide a space for equipment configured to regulate conditions inside the thermal barrier 206 or area inside the chamber 210. Such equipment may include, without limitation, heaters, heat exchangers, air conditioners, thermoelectric coolers, fans, humidifiers, dehumidifiers, etc. Furthermore, the buffer provided by thermal barrier 206 may comprise air, water, gas or any other natural or man-made medium. Finally, note that cabinet 200 may be constructed from any capable material, such as steel, stainless steel, aluminum, titanium, plastic, etc.

Figure 3:
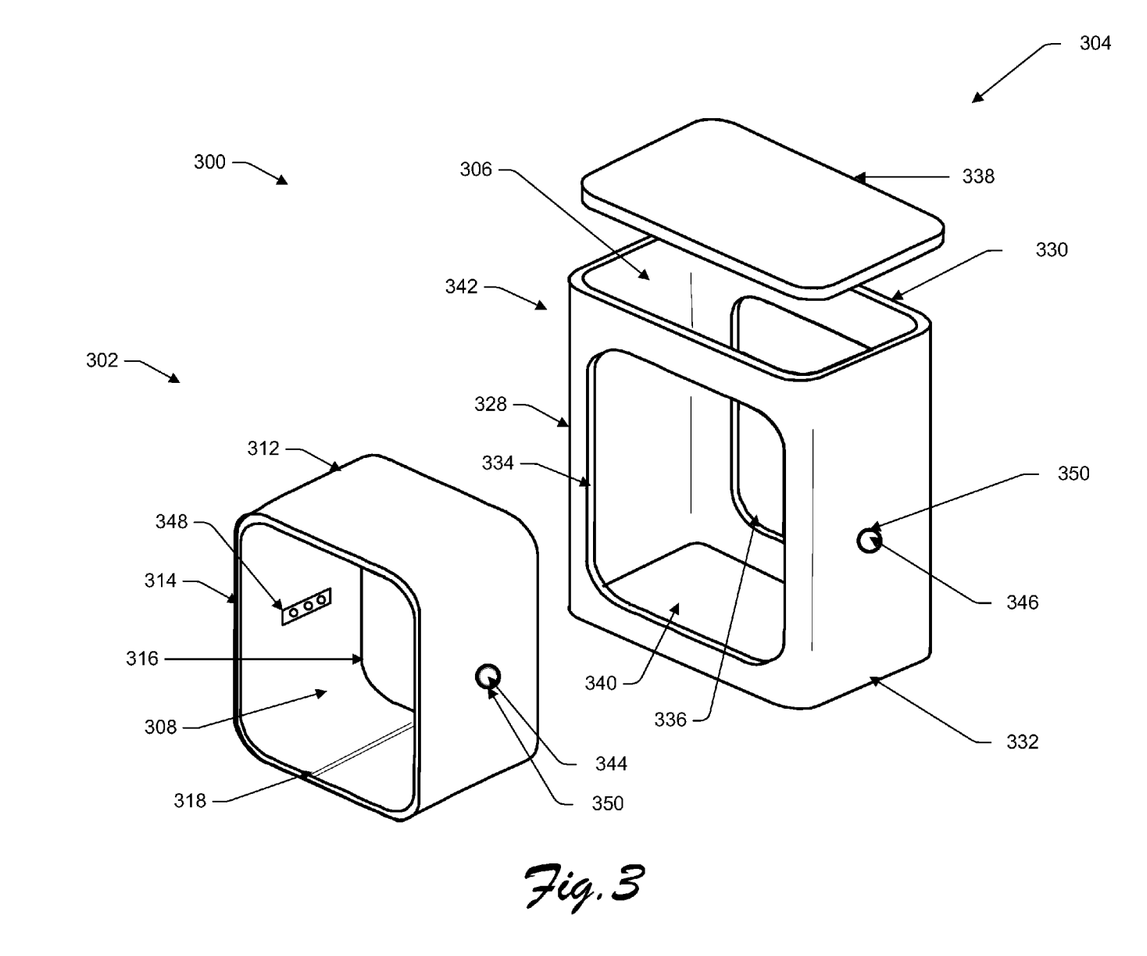
FIG. 3 is a perspective view of another exemplary cabinet of the present disclosure illustrated in greater detail.
Figure 4:
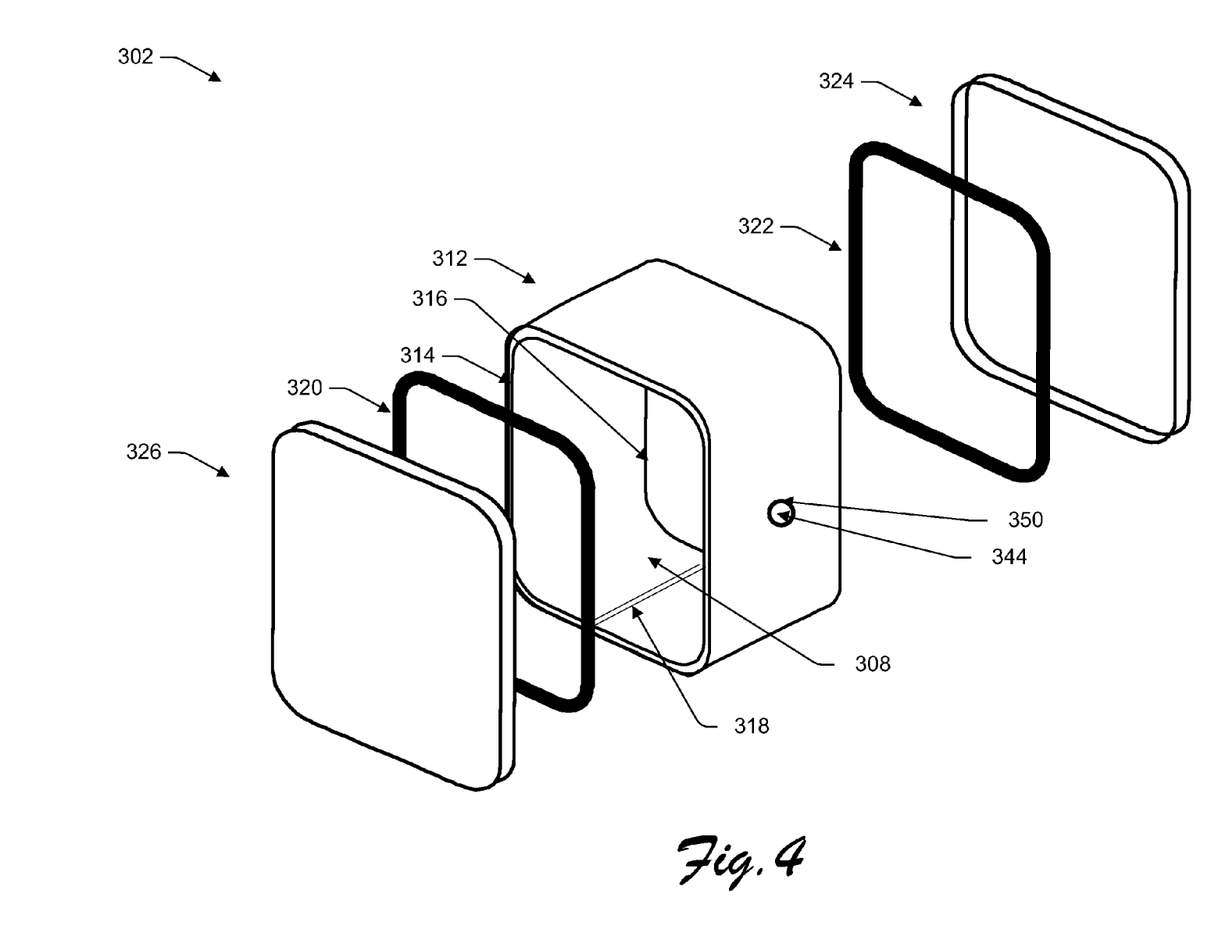
FIG. 4 is a perspective view of the chamber of the exemplary cabinet of FIG. 3.

FIGS. 3 and 4 depict another embodiment of a cabinet 300 of the present disclosure, and it may have many of the features described above in reference to cabinet 200. Cabinet 300 may be any size, although in some implementations it will be approximately 30" wide and 60" tall. Cabinet 300 may also include a chamber 302, a support structure 304, and a thermal barrier 306. Chamber 302 may also be configured to store equipment, which may be electronic and/or telecommunication equipment in the exemplary environment, in an area inside the chamber 308. Thermal barrier 306 may represent a buffer between the area inside the chamber 308 and an area outside the support structure 310. Thermal barrier 306 may substantially surround outside surfaces of tube 312. In the illustrated embodiment, thermal barrier 306 is filled with air, although it could be filled with any other medium such as water or another gas. When the cabinet 300 is used in outdoor applications, the outside elements (e.g. wind, rain, snow, etc.) will generally comprise the area outside the support structure 310. Therefore, when cabinet 300 is located outdoors, support structure 304 may function to isolate chamber 302 and the area inside the chamber 308 from the outside elements.

Chamber 302, shown in FIGS. 3 and 4, may include a tube 312. In this instance, tube 312 has two open ends, 314 and 316. In some embodiments, tube 312 may be manufactured from a single sheet of material, which strengthens chamber 302 and may help to decrease chamber's 302 manufacturing cost. A seam 318 shows where a single sheet of material may be secured so as to form tube 312. Tube 312 may be welded at seam 318, or it may be bolted, screwed, or otherwise secured in any capable manner. Open ends 314 and 316 may comprise parallel planes, which may be substantially orthogonal to a plane defined by ground level. For further reference, a plane defined by open end 314 or 316 may be substantially parallel to a force of gravity. As such, tube 312 may be a horizontal tube. Furthermore, while tube 312 is shown as a rectangular tube, the cross-section of tube 312 can be of varying shapes, such as oval, circular, square, etc.

FIG. 4 shows possible additional components of chamber 302, such as one or more seals 320. In the illustrated embodiment, chamber 302 includes two seals 320 and 322. Seals 320 and 322 may generally operate to attach to the edges of the chamber 302, and to seal the chamber at open ends 314 and 316. Seals 320 and 322 may be manufactured from any suitable material, such as a plastic. Chamber 302 may additionally have one or more barriers 324. Generally, chamber 302 will include two barriers 324, 326, as depicted in FIG. 4. Barriers 324 and 326 may function to permanently seal a respective end 314 or 316, or barriers 324 and 326 may function to releasably seal a respective end 314 or 316 of chamber 302. When a barrier functions to releasably seal one end, the barrier may be configured as a door. Generally, chamber 302 will include at least one door, and may include two doors. In the illustrated embodiment of FIG. 4, barrier 326 is a door and barrier 326 is a permanent barrier.

Barrier 324 may seal end 316 of chamber 302. Again, in the illustrated embodiment this may be a permanent seal. Barrier 324 may be coupled to chamber 302 in a variety of ways, such as by welds, bolts, screws, or any other capable fastener. When barrier 324 is coupled to chamber 302, seal 322 may be compressed to substantially or possible completely seal end 316. As such, end 316 may be sealed from any and all outdoor elements, such as wind, rain, sleet, snow, lightning, floods, etc., thereby protecting equipment in the area inside the chamber 308. Furthermore, to protect against lightning and the like, cabinet 300 may be connected to or may further comprise a surge protector.

As discussed above, barrier 326 may generally function as a door, which allows access to the area inside the chamber 308 while also allowing chamber 302 to be temporarily sealed. Door 326 may include door hardware, such as a hinge, a doorknob or other door opener, a latch, a lock, a doorstop, etc. Door components may attach to both tube 312, and/or other parts of chamber 302, as well as support structure 304. By attaching door components to the support structure 304, the area within the chamber 308 is maintained open, with maximum operating space and is clear from obstructions. Door 326 may be opened in order to access the area inside the chamber 308 and any equipment located therein. Furthermore, when door 326 is closed, it may compress seal 322, thereby sealing the area inside the chamber 308 and protecting any equipment therein. Again, if cabinet 300 is located outdoors, cabinet 300 may be protected from the outdoor elements.

Referring back to FIG. 3, support structure 304 will be discussed in greater detail. Support structure 304 may include a tube 328. Tube 328 may have two open ends, 330 and 332. In some embodiments, tube 328 may be manufactured from a single sheet of material, which strengthens support structure 304 and may help to decrease support structure's 304 manufacturing cost. Similar to tube 312, there may be a seam where a single sheet of material may be secured so as to form tube 328. Tube 328 may be welded at the seam, or it may be bolted, screwed, or otherwise secured in any capable manner. Open ends 330 and 332 may comprise parallel planes, which may be substantially parallel to the plane defined by ground level. For further reference, the plane defined by open end 330 or 332 may be substantially perpendicular to the force of gravity. As such, tube 328 may be a vertical tube. Furthermore, while tube 328 is shown as a rectangular tube, the cross-section of tube 328 can be of varying shapes, such as oval, circular, square, etc.

One or more sides of tube 328 may have a vacancy, such as vacancies 334 and 336. Vacancies 334 and 336 may function to allow for chamber 302, and particularly tube 312, to sit within support structure 304. As such, support structure 304 may be coupled to chamber 302, and help to strengthen chamber 302 and, accordingly, cabinet 300. Furthermore, when tube 312 is coupled with tube 328, tube 312 may be elevated from ground level. Support structure may further have a cabinet top 338 and/or a cabinet bottom 340. Cabinet top 338 may function to attach to and seal open end 330 of tube 328. Similarly, cabinet bottom 340 may function to attach to and seal open end 332. Again, top 338 and bottom 340 may be coupled to tube 328 by welds, bolts, screws, or otherwise secured in any capable manner. Furthermore, cabinet top 338 and cabinet bottom 340 may compress upon one or more seals for sealing support structure 304. When chamber 302 and tube 312 are coupled to tube 328, thermal barrier 306 may be defined. Furthermore, when cabinet top 338 and cabinet bottom 340 are also coupled to tube 328, thermal barrier 306 may be substantially or even completely sealed. Thermal barrier 306 may function to isolate a temperature in the area inside the chamber 308 from a temperature of an area outside the support structure 342.

It should be noted that the coupling of chamber 302 and support structure 304 in the manner described above represents significant advantages to the usefulness of cabinet 300. By intersecting horizontal tube 312 and vertical tube 328, cabinet 300 is strengthened in multiple directions. Vertical tube 328 adds rigidity to cabinet 300 that it otherwise would not contain, which is especially useful to protect against seismic events such as earthquakes. This is important in many industries that desire protection of sensitive equipment or components, such as the telecommunications industry. Therefore, this added strength may help to protect equipment from varying levels of seismic movement. Furthermore, cabinet 300 may pass industry requirements for withstanding seismic movement, such as a zone 4 seismic movement requirement.

Figure 5:
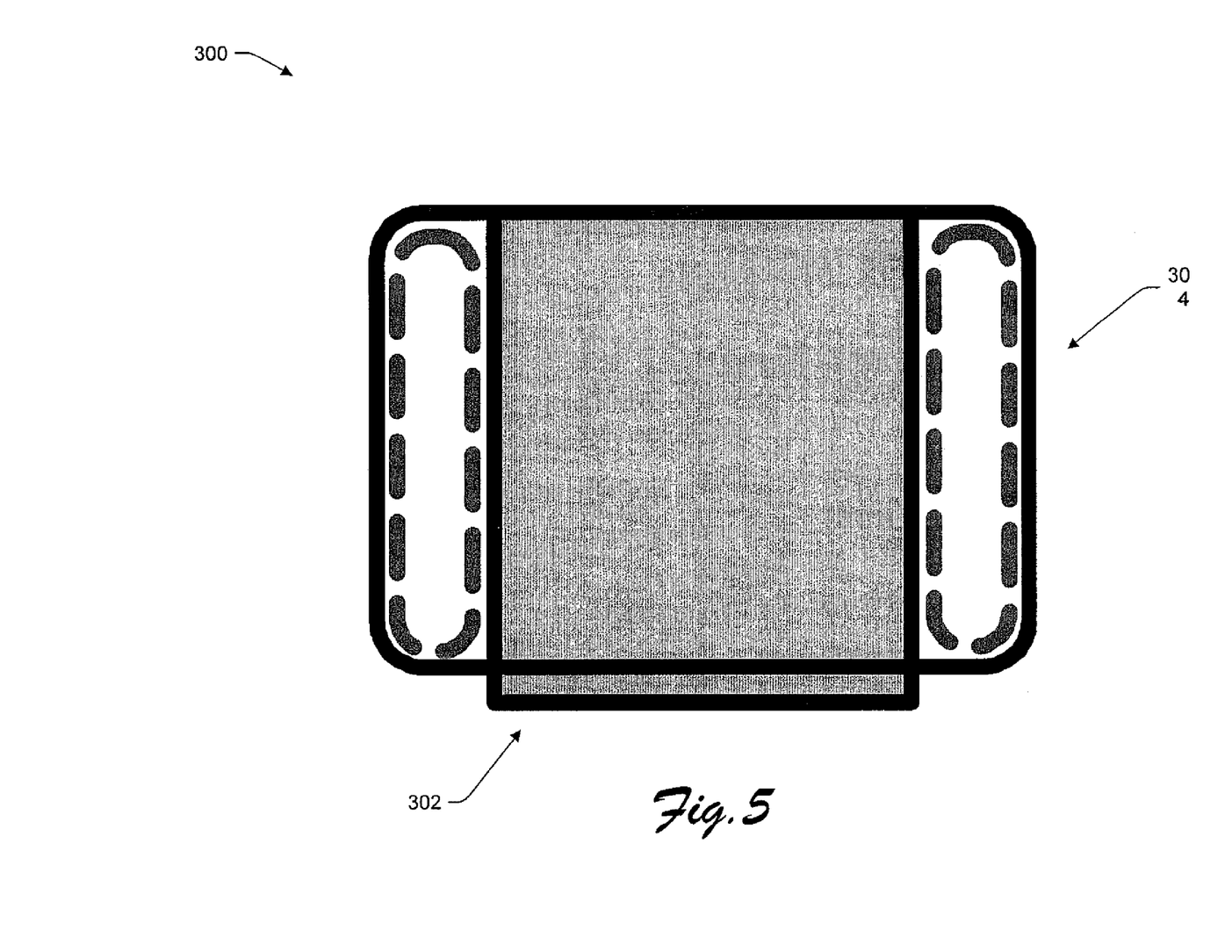
FIG. 5 is a top view of the exemplary cabinet of FIG. 3, illustrating how the support structure may function to support the chamber.

FIG. 5 shows a top view of cabinet 300 and how support structure 304 may function to support chamber 302. Again, equipment located within chamber 302 may need to be shielded from the outside elements. Accordingly, cabinet 300 provides a fully-sealed environment for the equipment. It may be desirable, however, for cables to enter and exit cabinet 300, in order to allow for the equipment to communicate with other equipment or for allow the equipment to be powered. Therefore, both tube 312 and tube 328 may have a vacancy 344 and a vacancy 346 for allowing the egress and ingress of cable or other connectors, as shown in FIG. 3. Vacancies 344 and 346 may further include water-tight cable fittings 350, thereby maintaining the sealed environment of cabinet 300 from the outside elements. Also shown in FIG. 3, cabinet 300 may also include at least one mount 348 configured to secure equipment to the cabinet and, in some instances, to the chamber 302. When mount 348 is configured to attach to chamber 302, mount 348 may be located in the area inside the chamber 308. Mount 348 may be configured to removably attach equipment to cabinet 300. While mount 348 may be any device capable of attaching the equipment to cabinet 300, in some instances it may comprise a wall mount, drawer, or a slide-in rack.

Figure 6:
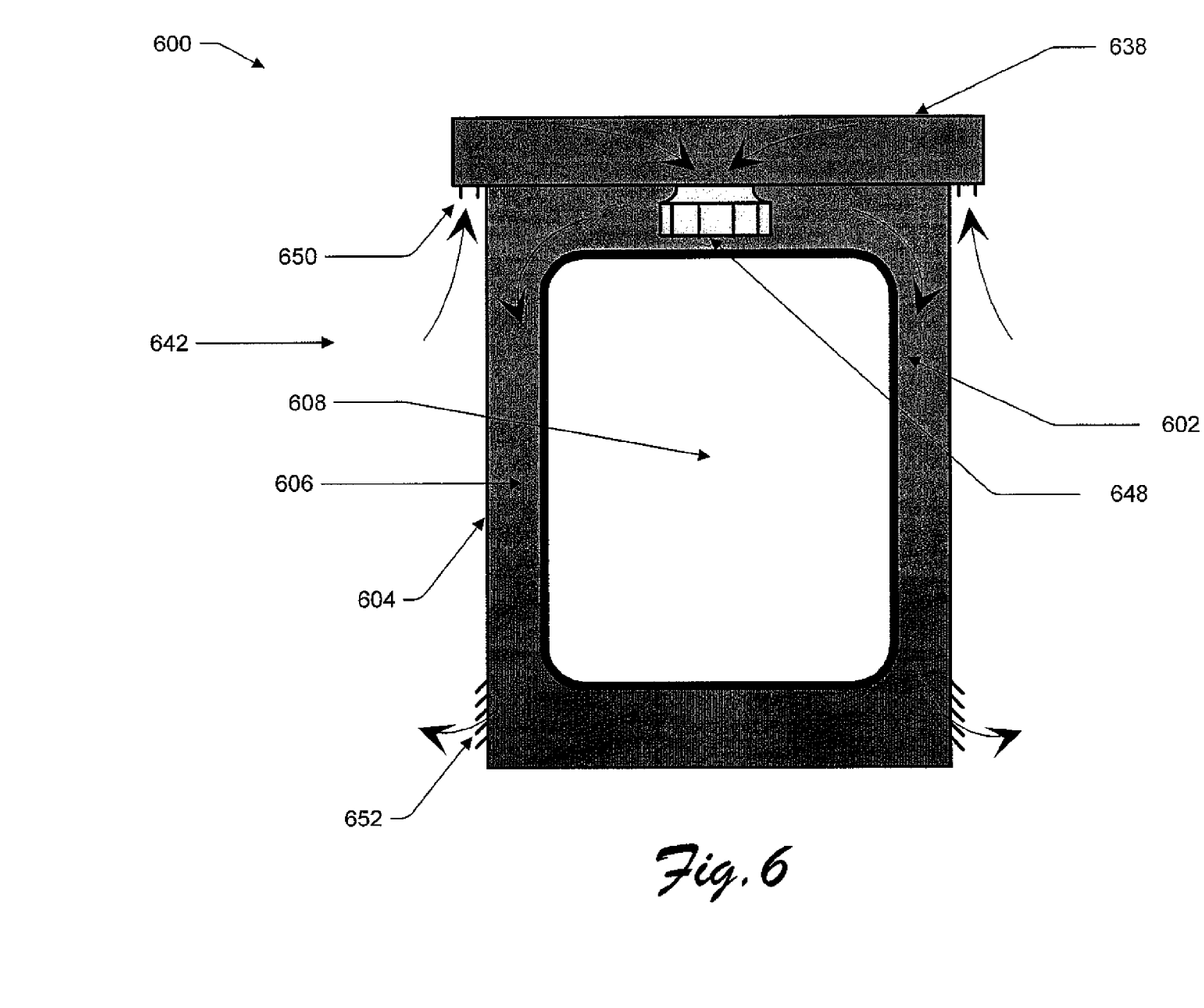
FIG. 6 is a cross-sectional view of another exemplary cabinet of the present disclosure, illustrating how the cabinet may include components to heat, cool or otherwise regulate the temperature of the thermal barrier and/or other regions of the cabinet.

FIG. 6 depicts a cross-section of another embodiment of a cabinet 600 of the present disclosure. Cabinet 600 may have many of the same features as cabinets 200 and 300 as described above. As in previous embodiments, cabinet 600 may include a thermal barrier 606. Furthermore, the equipment located within a chamber 602 may need the temperature of an area within the chamber 608 to be regulated. If, for example, the temperature in an area outside the support structure 642 is hot, the area 608 may need to be cooled in order to protect the equipment therein. Furthermore, the area 608 may need to be cooled merely because of the heat generated by the equipment in area 608, which may be electrical equipment that puts off a noticeable or substantial amount of heat. Conversely, if the temperature in the area outside the support structure 642 is too cold, the area 608 may be heated.

Therefore, cabinet 600 may further include temperature regulating equipment 648. Temperature regulating equipment 648 may be coupled to chamber 602, support structure 604, or any other suitable location in or on cabinet 600. In the illustrated embodiment, temperature regulating equipment 648 is located within thermal barrier 606 and attached to support structure 604. Temperature regulating equipment 648 may function to cool, heat, or otherwise regulate the temperature or other conditions within thermal barrier 606 or the area within the chamber 608. Exemplary temperature regulating equipment includes fans, heaters, heat exchangers, thermoelectric coolers, air conditioning units, etc. While temperature regulating equipment is shown to be located within thermal barrier 606, it could also be located within chamber 602 (i.e., in area 608). Temperature regulating equipment may function to regulate the temperature within thermal barrier 606, which may in turn regulate the temperature in area 608. This can be done, for example, by heating a tube 612 of chamber 602, or this may be done by a passageway in tube 612 that may allow the flow of air between area 608 and thermal barrier 606.

Furthermore, air from an area outside the support structure 642 may be pushed or pulled into thermal barrier 606 to help heat or cool thermal barrier 606, and hence chamber area 608. As shown in FIG. 6, cabinet 600 may include an air intake 650 for moving air from outside area 642 to thermal barrier 606. The temperature regulating equipment 648 may then move the air within thermal barrier 606 to help heat or cool thermal barrier 606. Cabinet 600 may also include an air outtake 652 for moving air from the thermal barrier 606 to the area outside the support structure 642. FIG. 6 depicts how this structure may function to force air from the outside through cabinet 600 before returning to the outside. All of the features described above function to provide a cabinet with added strength, a chamber that is completely sealed from the outdoor elements, and a system for regulating the temperature and other conditions of the area where sensitive equipment may be stored.

EXEMPLARY PROCEDURES

Figure 7:
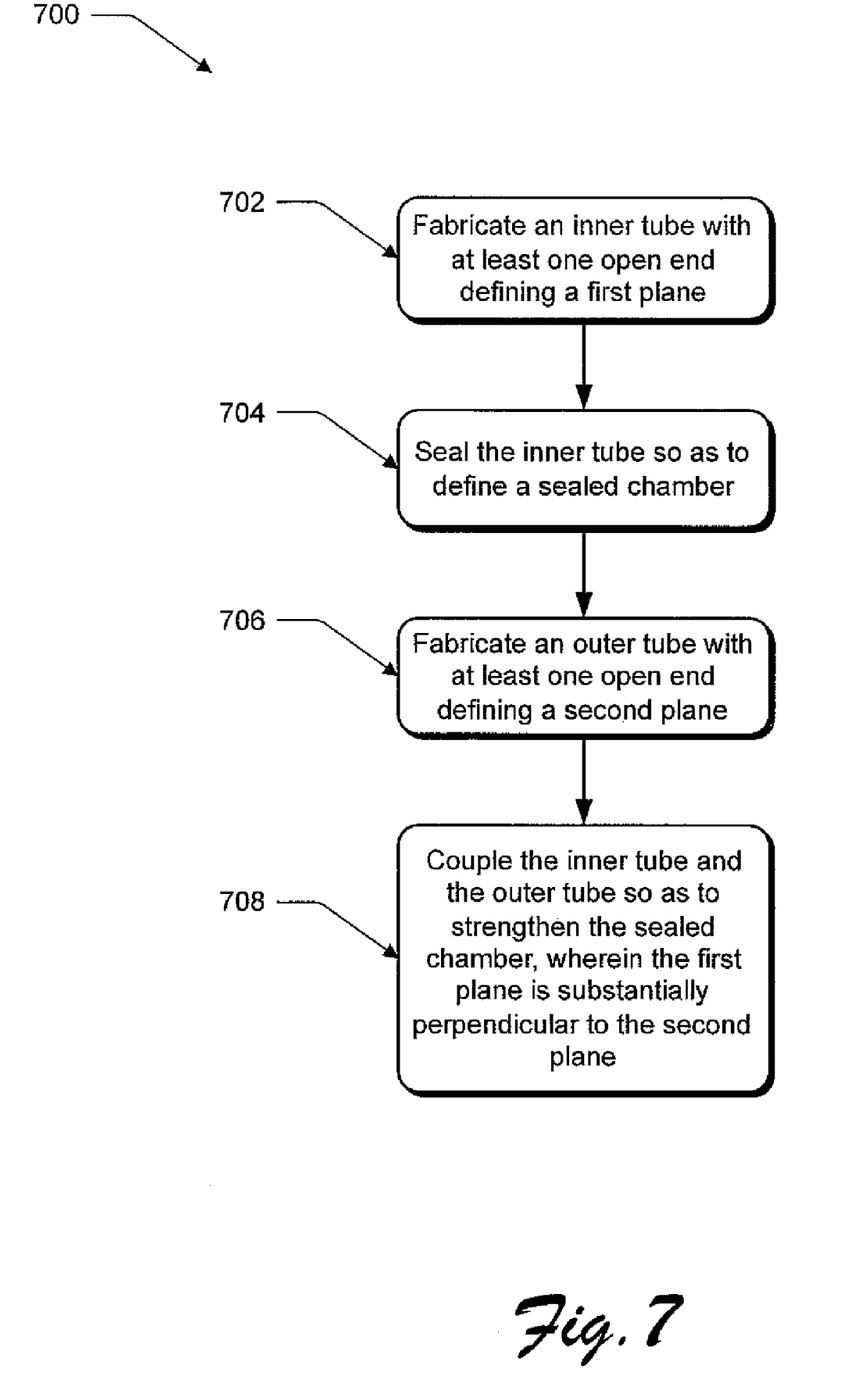
FIG. 7 is a flow diagram depicting a procedure in an exemplary implementation showing the forming of a cabinet.

The following discussion describes methods of making the cabinets described within. The procedures are shown as a set of blocks that specify operations performed and are not necessarily limited to the orders shown for performing the operations by the respective blocks. It should also be noted that the following exemplary procedures may be implemented in a wide variety of environments without departing from the spirit and scope thereof FIG. 7 is a flow diagram depicting a procedure 700 in an exemplary implementation in which a cabinet is formed to store equipment and/or components, such as telecommunication or electrical devices. In step 702, a user may begin by fabricating an inner tube with at least one open end defining a first plane. Next, in step 704, the user may seal the tube so as to define a sealed chamber. Step 706 is accomplished by fabricating an outer tube with at least one open end defining a second plane. Finally, step 708 includes coupling the inner tube and the outer tube so as to strengthen the sealed chamber, wherein the first plane is substantially perpendicular to the second plane. Additionally, a user may cool or heat the sealed chamber. Such a process may provide the user with a storage cabinet that is rigid and strong enough to dependably store sensitive equipment in a sealed and safe environment while having the ability to properly maintain the temperature surrounding the equipment.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
    a tubular sealed chamber configured to store telecommunications equipment, the tubular sealed chamber comprising:
        at least one mount located within the tubular sealed chamber and configured to removably attach telecommunications equipment,
        a tube; and
        at least one door configured to enclose one end of the tube; and
    a tubular support structure coupled to the sealed chamber and configured to support the sealed chamber, wherein the support structure is configured to at least partially surround the sealed chamber,
    wherein an area between the sealed chamber and the support structure defines an inter-tube space that is configured to function as a thermal barrier between a temperature inside the chamber and a temperature outside the support structure.

2. The apparatus of claim 1, wherein the sealed chamber comprises a tube, a seal and at least one door configured to enclose one end of the tube;
    the support structure comprises a tube with at least one open end; and
    wherein the chamber tube and the support structure tube are coupled substantially perpendicular.

3. The apparatus of claim 1, wherein the support structure further comprises:
    a top end of the support structure tube;
    a bottom end of the support structure tube;
    a cabinet top configured to enclose the top end; and
    a cabinet bottom configured to enclose the bottom end.

4. The apparatus of claim 3, wherein the thermal barrier is substantially sealed from the temperature outside the support structure and the temperature inside the chamber.

5. The apparatus of claim 1, further comprising a temperature-regulating device.

6. The apparatus of claim 5, wherein the temperature-regulating device is one of: a fan, a heat exchanger, a thermoelectric cooler or an air conditioning unit.

7. An apparatus comprising:
    an enclosure that is entirely sealed and is configured to maintain telecommunications equipment for a telecommunications infrastructure, the enclosure comprising:
        a horizontal tube with a cross-section defining a first plane;
        at least one open end;
        a door for sealing the at least one open end; and
        at least one mount located within the enclosure and configured to removably attach the telecommunications equipment;
    a cover comprising a vertical tube with a cross-section defining a second plane, wherein the vertical tube is configured to at least partially bound the horizontal tube, and wherein the first plane is substantially orthogonal to the second plane; and
    a thermal barrier, wherein the thermal barrier is defined by a space between the enclosure and the cover,
    wherein the horizontal tube is isolated from the vertical tube, and wherein an air gap between the horizontal tube and the vertical tube functions as the thermal barrier between a temperature inside the enclosure and a temperature outside the cover.

8. The apparatus of claim 7, further comprising water-tight cable fittings for allowing for ingress and egress of one or more cables configured to connect to telecommunications equipment.

9. The apparatus of claim 7, wherein the horizontal tube and the vertical tube are each configured to be manufactured by a single sheet of material.

10. The apparatus of claim 7, further comprising equipment configured to move air from an area outside the cover to the air gap between the horizontal tube and the vertical tube.

* * * * *